United States Patent
Okita et al.

(10) Patent No.: US 9,771,806 B2
(45) Date of Patent: Sep. 26, 2017

(54) TURBINE BLADE

(71) Applicants: IHI Corporation, Tokyo (JP); THE SOCIETY OF JAPANESE AEROSPACE COMPANIES, Tokyo (JP)

(72) Inventors: Yoji Okita, Tokyo (JP); Akira Murata, Tokyo (JP)

(73) Assignees: IHI CORPORATION (JP); THE SOCIETY OF JAPANESE AEROSPACE COMPANIES (JP)

(*) Notice: Subject to any disclaimer, the term of this patent is extended or adjusted under 35 U.S.C. 154(b) by 427 days.

(21) Appl. No.: 14/287,623

(22) Filed: May 27, 2014

(65) Prior Publication Data

US 2014/0271228 A1 Sep. 18, 2014

Related U.S. Application Data

(63) Continuation of application No. PCT/JP2012/081184, filed on Nov. 30, 2012.

(30) Foreign Application Priority Data

Nov. 30, 2011 (JP) .................................. 2011-262851

(51) Int. Cl.
F01D 5/18 (2006.01)

(52) U.S. Cl.
CPC .............. F01D 5/18 (2013.01); F01D 5/186 (2013.01); F01D 5/187 (2013.01);
(Continued)

(58) Field of Classification Search
CPC . F01D 5/18; F01D 5/187; F01D 5/186; F05D 2240/122; F05D 2240/127;
(Continued)

(56) References Cited

U.S. PATENT DOCUMENTS 7,766,615 B2 * 8/2010 Spangler ................. F01D 5/187
416/1
2003/0068222 A1 * 4/2003 Cunha ....................... F01D 5/18
415/115
(Continued)

FOREIGN PATENT DOCUMENTS

EP 1 961 917 A2 8/2008
JP 2003-138905 5/2003
(Continued)

OTHER PUBLICATIONS

International Search Report and Written Opinion mailed Feb. 19, 2013 in corresponding PCT International Application No. PCT/JP2012/081184.

*Primary Examiner* — Marina Tietjen
(74) *Attorney, Agent, or Firm* — Ostrolenk Faber LLP

(57) ABSTRACT

A turbine blade has hollowness, and is provided with a back-side wall of which a portion of the inner wall surface is exposed at the rear edge portion, with cooling air flown along the inner wall surface at the exposed region; and a recess provided in the inner wall surface at the exposed region. The contour of the recess (5) viewed from the normal direction of the inner wall surface of the back-side wall is set to a shape that is symmetrical centered on a reference axis (L) that intersects the flow direction of cooling air, and that broadens along the reference axis (L).

6 Claims, 5 Drawing Sheets

(52) U.S. Cl.
CPC .. *F05D 2240/122* (2013.01); *F05D 2240/127* (2013.01); *F05D 2240/304* (2013.01); *F05D 2240/31* (2013.01); *F05D 2260/2212* (2013.01); *F05D 2260/2214* (2013.01); *Y02T 50/673* (2013.01); *Y02T 50/676* (2013.01)

(58) Field of Classification Search
CPC ........... F05D 2240/31; F05D 2240/304; F05D 2260/2212; F05D 2260/2214; Y02T 50/673; Y02T 50/676
USPC ............................... 416/96 R, 97 R; 415/115
See application file for complete search history.

(56) References Cited

U.S. PATENT DOCUMENTS

| | | | | |
|---|---|---|---|---|
| 2008/0124225 | A1 | 5/2008 | Baldauf et al. ............. | 416/97 R |
| 2010/0119372 | A1* | 5/2010 | Gage ....................... | B23P 15/02 |
| | | | | 416/223 R |
| 2011/0176929 | A1* | 7/2011 | Ammann ................ | F01D 5/186 |
| | | | | 416/97 R |

FOREIGN PATENT DOCUMENTS

| | | |
|---|---|---|
| JP | 2008-519197 | 6/2008 |
| JP | 2008-520890 | 6/2008 |
| JP | 2010-043568 | 2/2010 |
| WO | WO 2006/047854 A1 | 5/2006 |
| WO | JP 2011-149427 | 8/2011 |

\* cited by examiner

TURBINE BLADE

This application is a Continuation of International Application No. PCT/JP2012/081184, filed on Nov. 30, 2012, claiming priority based on Japanese Patent Application No. 2011-262851, filed on Nov. 30, 2011, the content of which is incorporated herein by reference in their entity.

TECHNICAL FIELD

The present invention relates to a turbine blade.

BACKGROUND ART

A turbine blade that is mounted in a jet engine or the like is exposed to a high-temperature gas environment. For this reason, as a countermeasure against heat, a structure has been proposed in which the turbine blade is made to be hollow with a blowout port provided in the trailing edge, and by supplying cooling air to the interior of the turbine blade, the air is made to be blown out from the blowout port. In a turbine blade that adopts this structure, the blowout port is formed by notching a portion of the front-side wall of the turbine blade, and the trailing edge portion that becomes the highest temperature is reduced in thickness. The trailing edge undergoes film cooling by blowing out the cooling air while causing it to flow along the inner wall surface of the back-side wall that is exposed to the blowout port.

Also, Patent Document 1 and Patent Document 2 provide art that improves the heat transfer coefficient from the turbine blade to the cooling air by providing recesses or the like in the inner wall surface of the back-side wall that is exposed by the aforementioned notching.

Moreover, Patent Document 3 provides art that improves the heat transfer coefficient from the turbine blade to the cooling air by providing recesses or the like in the inner wall surface of the back-side wall in the interior of a turbine blade.

PRIOR ART DOCUMENTS

Patent Documents

[Patent Document 1] Japanese Unexamined Patent Application, First Publication No. 2010-43568
[Patent Document 2] Published Japanese Translation No. 2008-520890 of the PCT International Publication for Patent Application
[Patent Document 3] Japanese Unexamined Patent Application, First Publication No. 2003-138905

DISCLOSURE OF INVENTION

Problems to be Solved by the Invention

According to the art provided in the aforementioned Patent Documents 1 to 3, it is possible to increase the cooling effect of a turbine blade. However, if greater freedom is sought in the selection of forming materials or selection of shapes in the turbine blade, there is a need to further improve the cooling performance.

The present invention is achieved in view of the circumstances given above, and has as its object to further improve the cooling performance of a turbine blade.

Means for Solving the Problems

The present invention adopts the following constitution as a means for solving the aforementioned circumstances.

The turbine blade according to the first aspect of the present invention has hollowness and is provided with a front-side wall in which a blowout port is provided at a rear edge portion; a back-side wall of which a portion of the inner wall surface is exposed from the blowout port, with cooling air flown along the inner wall surface at the exposed region; and a recess provided in the inner wall surface of the back-side wall at the exposed region. The contour of the recess viewed from the normal direction of the inner wall surface of the back-side wall is set to a shape that is symmetrical centered on a reference axis that intersects the flow direction of cooling air, and that broadens along the reference axis.

According to the second aspect of the present invention, in the aforementioned first aspect, the shape of the recess in a perpendicular cross-section of the inner wall surface of the back-side wall passing along the reference axis has a linear-shaped region heading from a blade leading edge side end to the deepest portion of the recess arranged nearer the blade trailing edge, and an arc-shaped region that connects the deepest portion and the blade trailing edge side end.

According to the third aspect of the present invention, in the aforementioned first or second aspect, a plurality of the recesses are provided in the back-side wall, with the reference axis of each recess put in the same orientation.

According to the fourth aspect of the present invention, in any one of the aforementioned first to third aspects, the recess is further provided in a partial region of the inner wall surface of the back-side wall that faces the front-side wall and is continuous with the exposed region.

According to the fifth aspect of the present invention, in the aforementioned fourth aspect, the recess is further provided in a region that is a partial region of the inner wall surface of the front-side wall, and that faces the partial region of the inner wall surface of the back-side wall in which the recess is provided.

Effects of the Invention

In the present invention, the contour of the recess is set to a shape that is symmetrical centered on a reference axis that intersects the flow direction of cooling air, and that broadens along the reference axis. According to a recess with this kind of shape, it is possible to improve the heat transfer coefficient from a turbine blade to cooling air while maintaining the efficiency of film cooling. As a result, it is possible to further improve the cooling performance of the turbine blade.

BRIEF DESCRIPTION OF THE DRAWINGS

FIG. 3A is a plan view that is an enlarged view including one of the blowout ports that the turbine blade according to an embodiment of the present invention is provided with.

FIG. 4A is a plan view that is a schematic view showing the shape of the recess that the turbine blade according to an embodiment of the present invention is provided with.

FIG. 4B is a cross-sectional view that is a schematic view showing the shape of the recess that the turbine blade according to an embodiment of the present invention is provided with.

EMBODIMENTS FOR CARRYING OUT THE INVENTION

Figure 1:
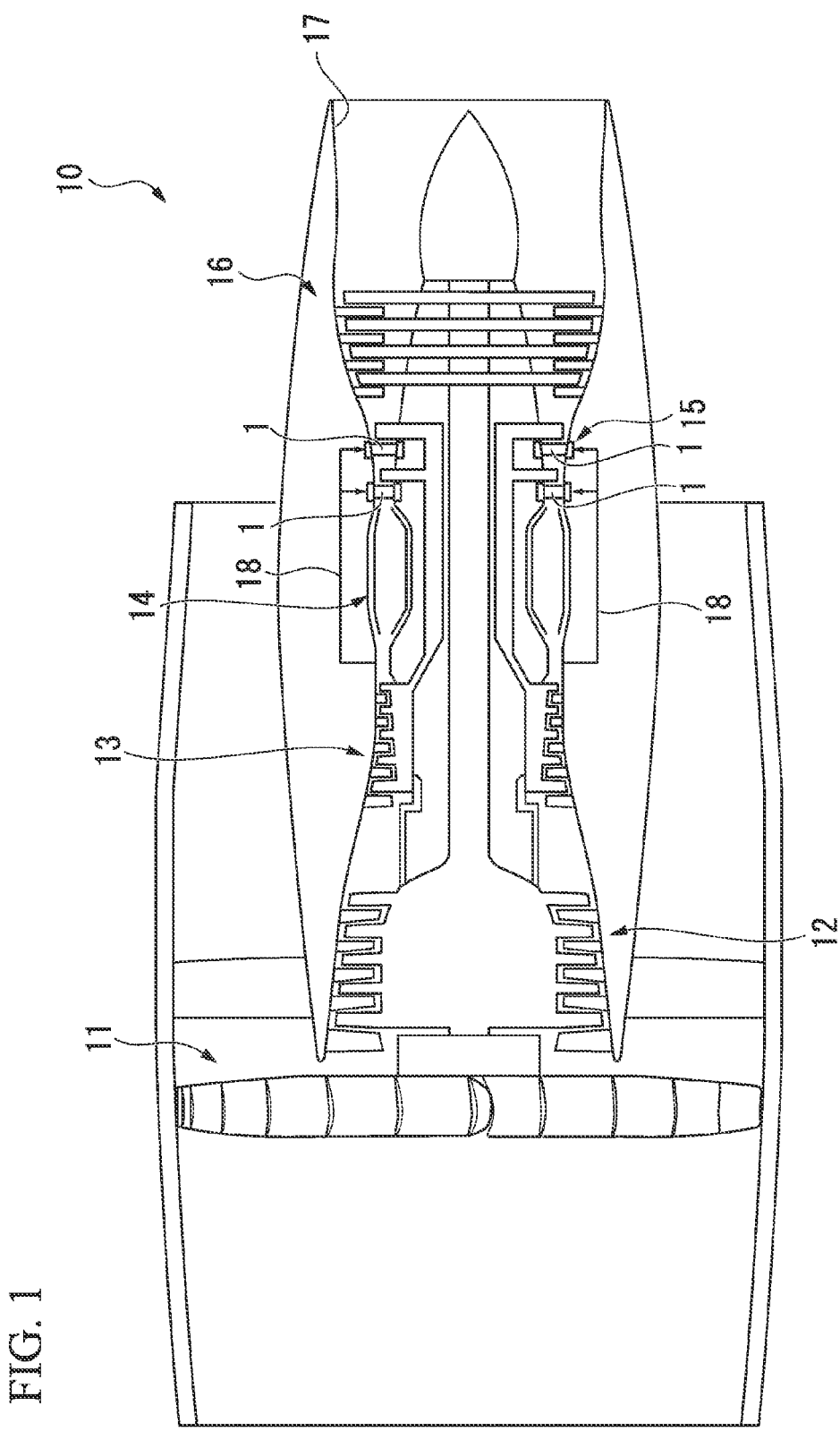
FIG. 1 is a vertical cross-sectional view that schematically shows a jet engine provided with the turbine blade according to an embodiment of the present invention.

Hereinbelow an embodiment of the turbine blade according to the present invention shall be described, referring to the drawings. Note that in the drawings given below, the scale of each member is suitably altered in order to make each member a recognizable size.

FIG. 1 is a vertical cross-sectional view that schematically shows a jet engine 10 that is provided with a turbine blade 1 of the present embodiment. The jet engine 10 is provided with a fan 11, a low-pressure compressor 12, a high-pressure compressor 13, a combustor 14, a high-pressure turbine 15, a low-pressure turbine 16, and a nozzle 17.

The fan 11 is arranged on the upstream-side end portion of the jet engine 10, and forms an airflow that is taken into the interior of the jet engine 10. The low-pressure compressor 12 is arranged on the downstream side of the fan 11, and compresses the air that is fed in from the fan 11. The high-pressure compressor 13 is arranged on the downstream side of the low-pressure compressor 12, and further compresses the air that is compressed by the low-pressure compressor 12. The combustor 14 is arranged on the downstream side of the high-pressure compressor 13, combusts fuel with the air that is compressed by the high-pressure compressor 13, and generates high-temperature gas. The high-pressure turbine 15 is arranged on the downstream side of the combustor 14, and generates the drive force of the high-pressure compressor 13 by converting to rotative power a portion of the energy contained in the high-temperature gas discharged from the combustor 14 to the downstream. The low-pressure turbine 16 is arranged on the downstream side of the high-pressure turbine 15, and generates the drive force of the fan 11 and the low-pressure compressor 12 by converting to rotative power a portion of the energy contained in the high-temperature gas discharged from the high-pressure turbine 15. Also, the nozzle 17 is arranged on the downstream side of the low-pressure turbine 16, and by ejecting the high-temperature gas that is discharged from the low-pressure turbine 16 to the rear of the jet engine 10, obtains thrust.

As shown in FIG. 1, the turbine blade 1 of the present embodiment is mounted in the jet engine 10 as a stator blade that the high-pressure turbine 15 is provided with. Note that the turbine blade 1 is connected with a bleed air flow passage 18 that supplies air bled from the upstream side of the combustor 14 to the turbine blade 1 as cooling air. Hereinbelow, referring to FIG. 2A to FIG. 4B, the turbine blade 1 shall be described in detail. In the following description, an end portion region at the front-edge side of the turbine blade 1 including a blade leading edge 1a (refer to FIG. 2A and FIG. 2B) shall be called a front edge portion 1A, and an end portion region at the rear-edge side of the turbine blade 1 including a blade trailing edge 1b (refer to FIG. 2A and FIG. 2B) shall be called a rear edge portion 1B.

Figure 2A:
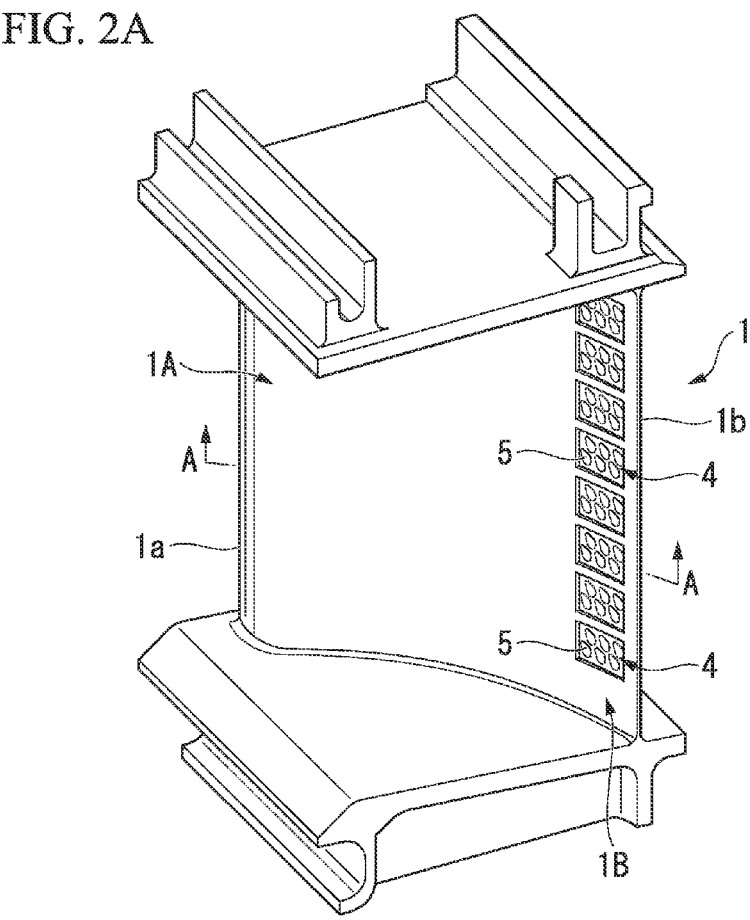
FIG. 2A is a perspective view that is an outline configuration drawing of the turbine blade according to an embodiment of the present invention.
Figure 2B:
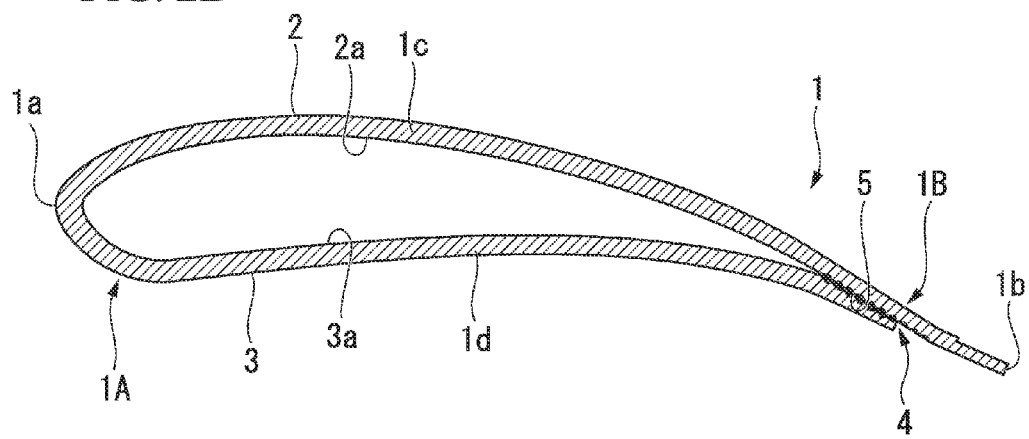
FIG. 2B is a cross-sectional view along the A-A line of FIG. 2A.

FIG. 2A and FIG. 2B are outline configuration drawings of the turbine blade 1 of the present embodiment. FIG. 2A is a perspective view, while FIG. 2B is a cross-sectional view along the A-A line in FIG. 2A. As shown in FIG. 2A and FIG. 2B, the turbine blade 1 of the present embodiment is provided with a back-side wall 2, a front-side wall 3, a blowout port 4, and recesses 5.

The back-side wall 2 is a wall portion that forms a back side 1c of the turbine blade 1. Also, the front-side wall 3 is a wall portion that forms a front side 1d of the turbine blade 1. The back-side wall 2 and the front-side wall 3 are connected by the blade leading edge 1a and the blade trailing edge 1b. A space is formed in the interior of the turbine blade 1 as a result of being enclosed by the back-side wall 2 and the front-side wall 3. Thereby, the turbine blade 1 has hollowness. Note that the blowout port 4 is provided at the rear edge portion 1B of the front-side wall 3. A portion of the inner wall surface 2a of the back-side wall 2 is exposed from the blowout port 4.

The blowout port 4 is formed by a portion of the front-side wall 3 being cut away at the rear edge portion 1B. The blowout port 4 blows out cooling air supplied to the interior of the turbine blade 1 via the bleed air flow passage 18 to the outside of the turbine blade 1. Also, the blowout port 4, as shown in FIG. 2A, is provided in a plurality (eight in the present embodiment) at regular intervals in the height direction of the turbine blade 1.

Figure 3A:
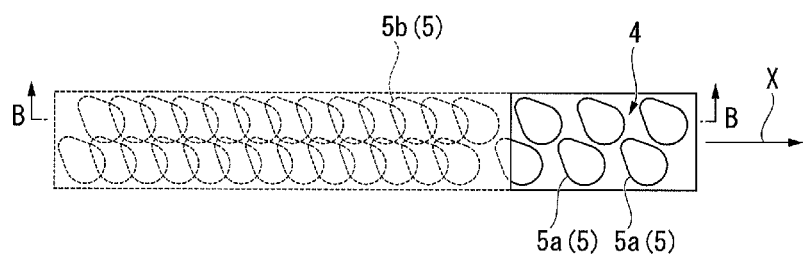
Figure 3B:
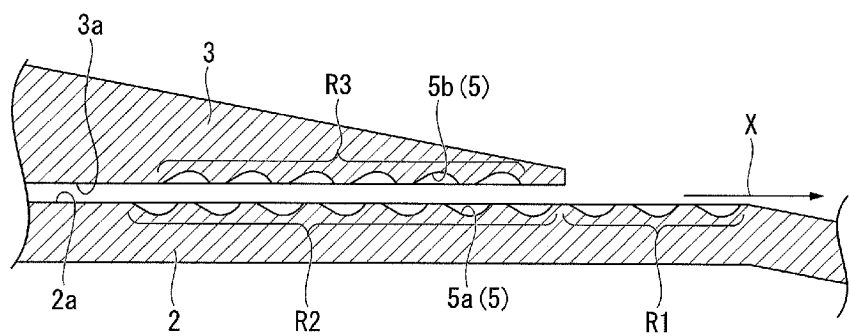
FIG. 3B is a cross-sectional view along the B-B line of FIG. 3A.

The recess 5 is a constitution for improving the heat transfer coefficient from the turbine blade 1 to the cooling air. The arrangement position of the recess 5 shall be described referring to FIG. 3A and FIG. 3B. FIG. 3A and FIG. 3B are enlarged views including one blowout port 4. FIG. 3A is a plan view, while FIG. 3B is a cross-sectional view along the B-B line of FIG. 3A. As shown in FIG. 3A and FIG. 3B, the recess 5 is provided in a plurality in the inner wall surface 2a of the back-side wall 2 and the inner wall surface 3a of the front-side wall 3.

In greater detail, a recess 5a provided in the inner wall surface 2a of the back-side wall 2 is provided over two rows in the height direction of the turbine blade 1 with respect to each blowout port 4, as shown in FIG. 3A. Also, in each row, 10 of the recesses 5a are arrayed at equal intervals in the flow direction X of the cooling air. Among these recesses 5a, three of the recesses 5a on the rear-edge side of the turbine blade 1 in each row are provided in a portion of the inner wall surface 2a of the back-side wall 2 that is exposed by the blowout port 4 (exposed region R1). The remaining recesses 5a are as shown in FIG. 3B provided in an inner region R2 that is recessed to the inner side of the blowout port 4 (a partial region of the inner wall surface 2a of the back-side wall 2 that faces the front-side wall 3 and is continuous with the exposed region R1).

A recess 5b provided in the inner wall surface 3a of the front-side wall 3 is as shown in FIG. 3B provided in an inner region R3 that is recessed to the inner side of the blowout port 4 (a region facing the inner region R2 in which the recess 5a is provided). As shown in FIG. 3A, the recess 5b is provided over two rows in the height direction of the turbine blade 1. Also, in each row, six of the recesses 5b are arrayed in the flow direction X of the cooling air at the same interval as the recesses 5a.

Note that in the present embodiment, the recesses 5a that are provided in the inner wall surface 2a of the back-side wall 2 and the recesses 5b that are provided in the inner wall surface 3a of the front-side wall 3 are arranged so as to match in the height direction of the turbine blade 1, and arranged out of alignment by a half pitch in the flow direction X of the cooling air.

Figure 4A:
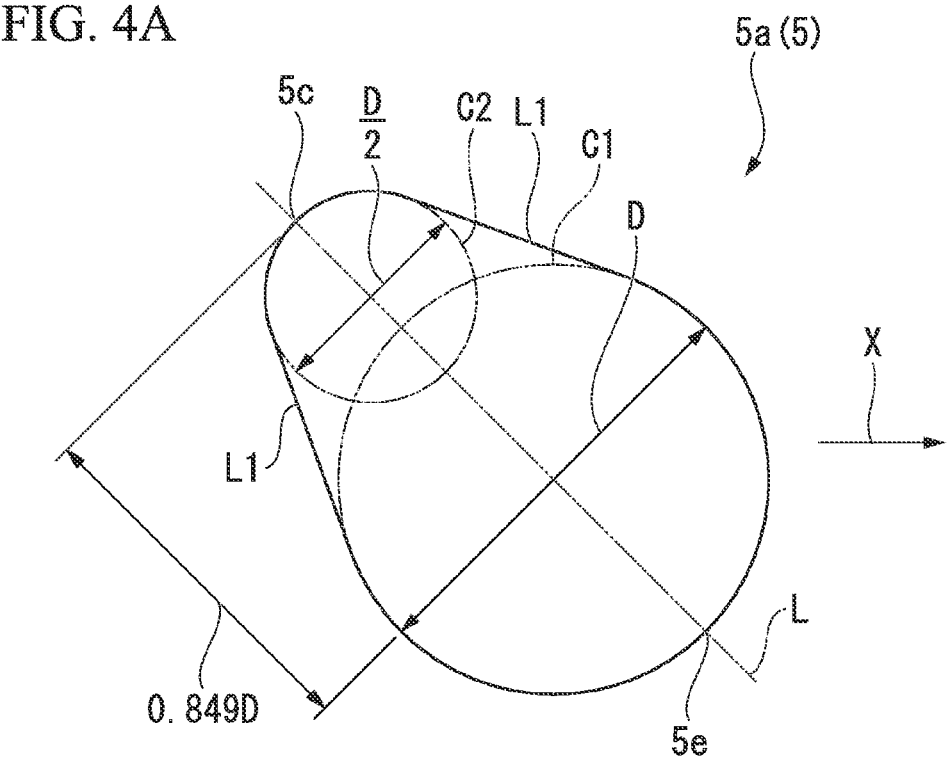
Figure 4B:
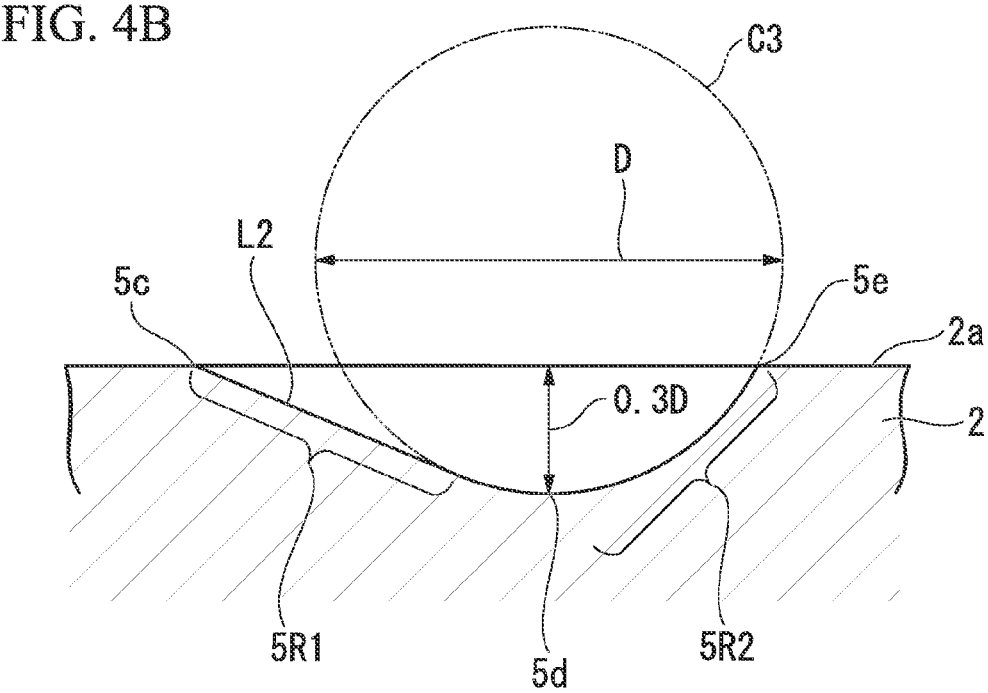

Next, the shape of the recess 5 shall be described referring to FIG. 4A and FIG. 4B. FIG. 4A is an enlarged view of one recess 5a, being a drawing viewed from the normal direction of the inner wall surface 2a of the back-side wall 2 (plan view). As shown in FIG. 4A, the contour of each recess 5a is arranged in a direction in which a circle C1 of ΦD and a circle C2 of Φ(½)D are inclined 45 degrees with respect to the flow direction X of the cooling air so that the distance from the blade leading edge side end 5c to the center of the circle C1 is 0.849 D. Also, the contour of each recess 5a has the outer shape of the drawing that is formed by connecting the circle C1 and the circle C2 by common tangents L1. That is to say, the contour of the recess 5a is a shape that is left-right symmetrical centered on a hypothetical reference axis L that intersects the flow direction X of cooling air at a 45 degree angle. Also, the contour of the recess 5a is set to a shape that broadens along the reference axis L heading toward the rear-edge side of the turbine blade 1.

FIG. 4B is a drawing that shows a perpendicular cross section of the inner wall surface 2a of the back-side wall 2 passing along the reference axis L shown in FIG. 4A. As shown in FIG. 4B, the cross-sectional shape of the recess 5a consists of a circular arc that cuts away a circle C3 of ΦD at a depth of 0.3 D, and a tangent L2 of the circle C3. Also, the distance of the center of the circle C3 to the end of the tangent L2 in the direction along the inner wall surface 2a is 0.849 D. Thereby, the cross-sectional shape of the recess 5a has a linear-shaped region 5R1 heading from the blade leading edge side end 5c to a deepest portion 5d of the recess 5 that is arranged nearer the blade trailing edge, and an arc-shaped region 5R2 that connects the deepest portion 5d and a blade trailing edge side end 5e. That is to say, the cross-sectional shape of the recess 5a is a shape that inclines gently from the blade leading edge side end 5c to the deepest portion 5d (has a small angle of inclination), and sharply rises up from the deepest portion 5d to the blade trailing edge side end 5e (curves with a large angle of inclination).

The overall shape of the recess 5a is a shape that couples the contour shown in FIG. 4A and the cross-sectional shape shown in FIG. 4B with a spline surface. Note that the shape of the recess 5b is also set to the same shape as the recess 5a.

The recesses 5a, 5b that are set to the aforementioned shape are arranged so that the reference axis L of each recess 5 becomes the same orientation (direction) as shown in FIG. 3A. That is to say, the recesses 5a, 5b are arranged in an orientation so that the reference axis L inclines 45 degrees to the flow direction X of cooling air, when viewed from the normal direction of the inner wall surface 2a of the back-side wall 2.

Next, the operation and effect of the turbine blade 1 of the present embodiment shall be described. When cooling air is supplied from the bleed air flow passage 18 to the interior of the turbine blade 1, the cooling air that is supplied passes through the interior of the turbine blade 1 and is blown out from the blowout port 4 to the outside of the turbine blade 1.

As shown in FIG. 3B and FIG. 4B, the cooling air is blown out from the blowout port 4 and flows along the inner wall surface 2a of the back-side wall 2, flows into the recesses 5a that are provided in the exposure region R1. Subsequently, the cooling air flows along the linear-shaped region 5R1 and reaches the deepest portion 5d, and then flows from the deepest portion 5d along the arc-shaped region 5R2 to flow out to the outside of the recess 5a. At this time, the deepest portion 5d is arranged nearer the blade trailing edge, whereby the linear-shaped region 5R1 has a gentle slope. For this reason, the cooling air that flown flows into the recess 5a from the blade leading edge side end 5c slows down and reaches the deepest portion 5d without separating from the inner wall surface of the recess 5a. Subsequently, the cooling air accelerates due to the deepest portion 5d to the blade trailing edge side end 5e sharply rising in the recess 5a.

According to the aforementioned constitution, it is possible to inhibit separation of the cooling air that flows into the recess 5a from the inner wall surface at the blade leading edge side of the recess 5a. For this reason, it is possible to increase the cooling efficiency of the turbine blade more than the case of installing for example a dimple-shaped recess. Also, according to the recess 5a, it is possible to produce a small vortex by accelerating the cooling air in the arc-shaped region 5R2, and it is possible to promote heat transfer from the turbine blade 1 to the cooling air by the vortex.

Also, the recess 5a is arranged at an orientation in which the reference axis L is inclined 45 degrees with respect to the flow direction X of cooling air as described above. For this reason, a velocity component perpendicular to the flow direction X is imparted to the cooling air that has flowed into the recess 5a. Thereby, a swirl flow centered on an axis along the flow direction X is formed. As a result, it is possible to obtain an effect of promoting heat transfer by the swirl flow.

The recesses 5a provided in the inner region R2 shown in FIG. 3B and the recesses 5b provided in the inner region R3 both can obtain the same action and effect as the recesses 5a provided in the exposed region R1. By providing the recesses 5 in the inner region R2 and the inner region R3, the effect of promoting heat transfer by these recesses 5 is increased. As a result, the cooling performance to the turbine blade is further improved.

According to the turbine blade 1 of the present embodiment, it is possible to improve the heat transfer coefficient from the turbine blade 1 to the cooling air with the recesses 5 having the shape described above, and it is possible to further improve the cooling performance to the turbine blade than the case of providing dimple-shaped recesses.

Also, in the present embodiment, the orientation of each recess 5 is set so that the orientations (directions) of the reference axis L of the recesses 5 are the same. For this reason, in each recess 5, a velocity component of the same direction is imparted to the flow of the cooling air, and so it is possible to efficiently form a swirl flow.

Next, the result of a simulation performed to verify the effect of the turbine blade 1 of the aforementioned embodiment shall be described.

Note that in this simulation, the verification was performed for the following Case 1 to Case 7.

In Case 1, a simulation was performed using a model in which the exposed region R1, the inner region R2, and the inner region R3 shown in FIG. 3B were made flat with no recesses 5.

In Case 2, a simulation was performed using a model providing recesses (outer shape the same as the recesses 5) whose reference axis L is parallel with the flow direction X only in the exposed region R1 and the inner region R2 shown in FIG. 3B, and providing the recesses in three rows in the height direction of the turbine blade.

In Case 3, a simulation was performed using a model providing recesses (outer shape the same as the recesses 5) whose reference axis L is parallel with the flow direction X in the exposed region R1, the inner region R2 and the inner region R3 shown in FIG. 3B, and providing the recesses in three rows in the height direction of the turbine blade.

In Case 4, a simulation was performed using a model providing recesses (outer shape the same as the recesses 5) whose reference axis L is parallel with the flow direction X only in the inner region R2 and the inner region R3 shown in FIG. 3B, and providing the recesses in three rows in the height direction of the turbine blade.

In Case 5, a simulation was performed using the same model as the embodiment described above (the model providing the recesses 5 in the exposed region R1, the inner region R2, and the inner region R3 shown in FIG. 3B, and providing the recesses in two rows in the height direction of the turbine blade).

In Case 6, a simulation was performed using a model providing recesses (outer shape the same as the recesses 5) whose reference axis L is parallel with the flow direction X in the exposed region R1, the inner region R2, and the inner region R3 shown in FIG. 3B, and providing the recesses in two rows in the height direction of the turbine blade.

In Case 7, a simulation was performed using a model providing dimple-shaped recesses whose planar shape is circular and whose cross-sectional shape is arc-shaped in the exposed region R1, the inner region R2, and the inner region R3 shown in FIG. 3B, and providing the recesses in two rows in the height direction of the turbine blade.

Figure 5A:
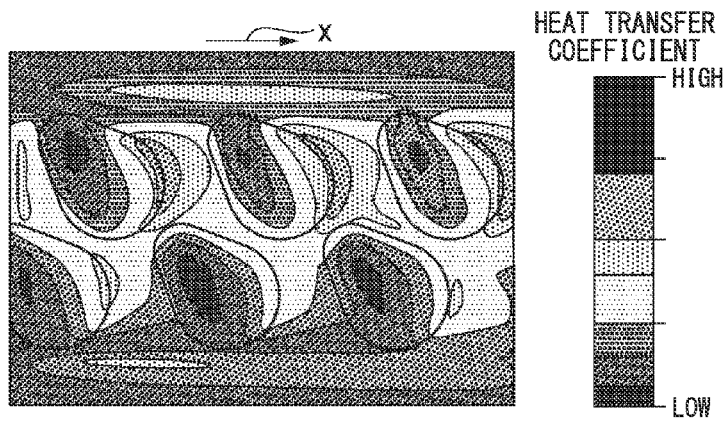
FIG. 5A is a distribution chart that shows the distribution of the heat transfer coefficient, showing the simulation result for verifying the effect of the turbine blade in an embodiment of the present invention.
Figure 5B:
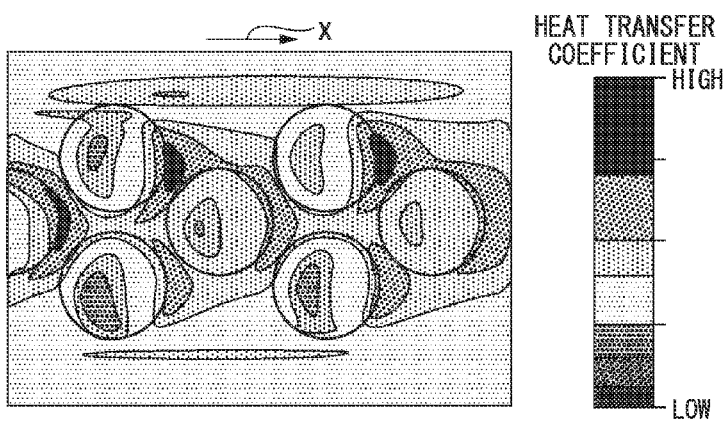
FIG. 5B is a distribution chart that shows the distribution of the heat transfer coefficient, showing the simulation result for verifying the effect of the turbine blade in an embodiment of the present invention.

FIG. 5A is a distribution chart of the heat transfer coefficient in Case 5 (the turbine blade 1 of the embodiment). FIG. 5B is a distribution chart of the heat transfer coefficient in Case 7. As is evident from these diagrams, the shape of the recess 5 that is adopted in the embodiment above can realize a heat transfer coefficient that is considerably higher than the heretofore generally used recess of Case 7 adopted in Patent Document 1 and Patent Document 2 mentioned above.

Figure 5C:
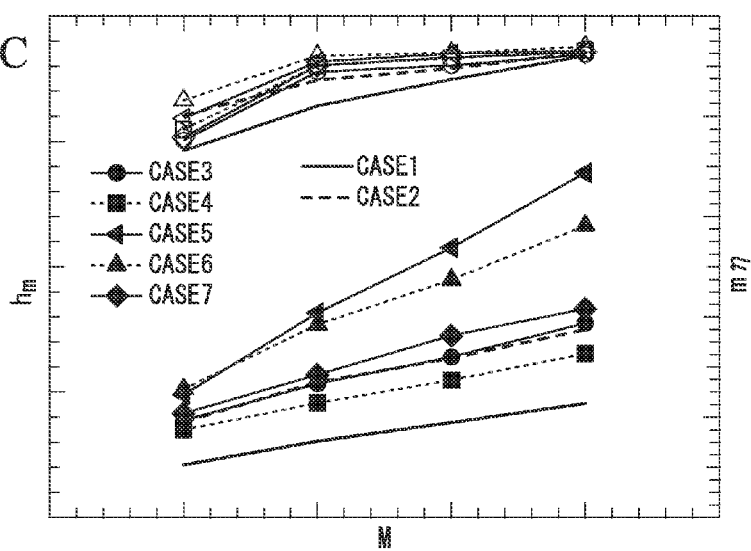
FIG. 5C is a graph that shows the simulation result for verifying the effect of the turbine blade in an embodiment of the present invention, showing the relationship between the cooling air flow rate and the heat transfer coefficient, and the relationship between the cooling air flow rate and the film cooling efficiency.

FIG. 5C is a graph that shows the relationship between the cooling air flow rate (M) and the heat transfer coefficient (hm) in cases 1 to 7, and the relationship between the cooling air flow rate (M) and the film cooling efficiency (ηm) in cases 1 to 7. In FIG. 5C, the graph group shown at the bottom (the plurality of graphs including the graphs whose points are shown in black) are the graphs that show the relationship between the cooling air flow rate (M) and the heat transfer coefficient (hm). Also, in FIG. 5C, the graph group shown at the top (the plurality of graphs including the graphs whose points are shown in outline) are the graphs that show the relationship between the cooling air flow rate (M) and the film cooling efficiency (ηm). Note that in the graphs that show the relationship between the cooling air flow rate (M) and the film cooling efficiency (ηm), the points are shown in outline but show the results obtained by the same cases as the black points whose shapes are the same.

As shown in FIG. 5C, the heat transfer coefficient in the turbine blade 1 of the embodiment was found to be the highest. Also, as is evident from a comparison of Case 5 and Case 6, the heat transfer coefficient improves by causing the reference axis L to be inclined with respect to the flow direction X. Also, as is evident from a comparison of Case 1 and the other cases 2 to 7, the heat transfer coefficient improves by providing the recesses. Also, as is evident from a comparison of Case 3 and Case 4, the heat transfer coefficient improves by providing the recesses not only in the exposed region R1 but also in the inner region R2 and the inner region R3.

Also, as is evident from the graph showing the relationship between the cooling air flow rate (M) and the film cooling efficiency (ηm), regardless of the presence of recesses or the shape of the recesses, the film cooling efficiency is always high. Accordingly, it was found that the turbine blade 1 of the present embodiment is capable of improving the heat transfer coefficient without lowering the film cooling efficiency.

Hereinabove, preferred embodiments of the present invention have been described with reference to the appended drawings, but the present invention is not limited to the aforementioned embodiment. The various shapes and combinations of each constituent member shown in the embodiment described above refer to only a single example, and may be altered in various ways based on design requirements and so forth within a scope that does not deviate from the subject matter of the present invention.

For example, in the aforementioned embodiment, the description is given for an example that applies the turbine blade of the present invention to the stator blade of a high-pressure turbine 15.

However, the present invention is not limited thereto. The turbine blade of the present invention can also be applied to the rotor blade of the high-pressure turbine 15, or to the stator blade or rotor blade of the low-pressure turbine 16.

Also, the number of blowout ports 4 in the aforementioned embodiment is merely an example, and can be altered.

In addition, in the case of providing a plurality of the blowout ports 4, the number, size and arrangement pattern of the recesses 5 that are provided in correspondence to the blowout ports 4 may also be altered. For example, there are variations in the flow rate distribution of high-temperature gas in the height direction of the turbine blade 1. In this case, more recesses may be provided in the blowout ports 4 in which the flow rate of high-temperature gas is high, while fewer recesses may be provided in the blowout ports in which the flow rate of high-temperature gas is low. Also, the size of the recesses that are arrayed in the flow direction X of the cooling air may be gradually increased heading to the downstream, and conversely may also be gradually decreased heading to the downstream.

Also, in the embodiment given above, definite values for specifying the shape of the recess 5a are merely examples, and can be changed. That is to say, the contour of the recess of the present invention need only be set to a shape that is symmetrical centered on the reference axis that intersects the flow direction X of cooling air, and also broadens along the reference axis. For example, the angle of inclination of the reference axis with respect to the flow direction X need not be 45 degrees, and may also be 30 degrees or 20 degrees.

INDUSTRIAL APPLICABILITY

According to the present invention, it is possible to improve the heat transfer coefficient from a turbine blade to cooling air while maintaining the efficiency of film cooling, and further improve the cooling performance to the turbine blade.

DESCRIPTION OF THE REFERENCE SYMBOLS

1: turbine blade
1B: rear edge portion

1a: blade leading edge
1b: blade trailing edge
1c: back side
1d: front side
2: back-side wall
2a: inner wall surface
3: front-side wall
3a: inner wall surface
4: blowout port
5, 5a, 5b: recess
5c: blade leading edge side end
5d: deepest portion
5e: blade trailing edge side end
5R1: linear-shaped region
5R2: arc-shaped region
L: reference axis
L1: common tangent
L2: tangent
R1: exposed region
R2: inner region
R3: inner region
X: flow direction of cooling air

The invention claimed is:

1. A turbine blade having hollowness, comprising a front-side wall in which a blowout port is provided at the rear edge portion; a back-side wall of which a portion of the inner wall surface is exposed from the blowout port, with cooling air flowing along the inner wall surface at the exposed region; and a first recess provided in the inner wall surface of the back-side wall at the exposed region,
wherein the contour of the first recess, viewed from the normal direction of the inner wall surface of the back-side wall, is set to a shape that is symmetrical centered on a reference axis that intersects the flow direction of cooling air at 45 degrees with respect to the flow direction of cooling air, and that broadens along the reference axis,
the first recess is further provided in a partial region of the inner wall surface of the back-side wall that faces the front-side wall and is continuous with the exposed region,
a second recess having the same shape as the first recess is further provided in a region that is a partial region of the inner wall surface of the front-side wall, and that faces the partial region of the inner wall surface of the back-side wall in which the first recess is provided, and
perpendicular cross-sectional shapes of the first recess and the second recess include respective circular arcs with a depth equivalent to 0.3 multiplied by a diameter of a respective circle including a respective circular arc of the respective circular arcs.

2. The turbine blade according to claim 1, wherein the shape of the first recess in a perpendicular cross-section of the inner wall surface of the back-side wall passing along the reference axis comprises a linear-shaped region heading from a blade leading edge side end to the deepest portion of the first recess arranged nearer the blade trailing edge, and an arc-shaped region that connects the deepest portion and the blade trailing edge side end.

3. The turbine blade according to claim 1, wherein a plurality of the first recesses are provided in the back-side wall, with the reference axis of each first recess having the same orientation.

4. The turbine blade according to claim 1, wherein a bottom of the first recess in the partial region of the inner wall surface of the back-side wall is completely located in the back-side wall and a bottom of the second recess in the partial region of the inner wall surface of the front-side wall is completely located in the front-side wall.

5. The turbine blade according to claim 1, wherein the shape of the second recess in a perpendicular cross-section of the inner wall surface of the front-side wall passing along the reference axis comprises a linear-shaped region heading from a blade leading edge side end to the deepest portion of the second recess arranged nearer the blade trailing edge, and an arc-shaped region that connects the deepest portion and the blade trailing edge side end.

6. The turbine blade according to claim 1, wherein a plurality of the second recesses are provided in the front-side wall, with the reference axis of each second recess having the same orientation.

* * * * *